United States Patent

Volkers et al.

[11] Patent Number: 5,533,772
[45] Date of Patent: Jul. 9, 1996

[54] ASHTRAY AND CONTAINER HOLDER FOR MOTOR VEHICLES

[75] Inventors: Jan Volkers, Neuss; Volkhard Wick, Leichlingen und; Volker Dabringhaus, Wuppertal, all of Germany

[73] Assignee: Gebr. Happich GmbH, Germany

[21] Appl. No.: 239,398

[22] Filed: May 6, 1994

[30] Foreign Application Priority Data

May 11, 1993 [DE] Germany .................. 43 15 584.7

[51] Int. Cl.$^6$ .................................................. A47K 1/08
[52] U.S. Cl. ................................. 296/37.9; 224/926
[58] Field of Search .......................... 296/37.9, 37.8, 296/37.11, 37.12, 37.13; 224/926, 278, 282, 553

[56] References Cited

U.S. PATENT DOCUMENTS

| 3,186,671 | 7/1963 | Standley . | |
|---|---|---|---|
| 3,356,409 | 9/1965 | Belsky et al. . | |
| 4,087,126 | 5/1978 | Wynn . | |
| 4,286,742 | 9/1981 | Pellegrino | 296/37.9 X |
| 4,535,923 | 8/1985 | Manke . | |
| 4,953,772 | 9/1990 | Phifer . | |
| 5,423,508 | 6/1995 | Isanga et al. | 224/926 X |

FOREIGN PATENT DOCUMENTS

| 0007974 | 2/1980 | European Pat. Off. . | |
|---|---|---|---|
| 0121119 | 10/1984 | European Pat. Off. . | |
| 0131119 | 10/1984 | European Pat. Off. . | |
| 6072228 | 3/1994 | Japan | 296/37.9 |
| 6072227 | 3/1994 | Japan | 296/37.9 |
| 6072225 | 3/1994 | Japan | 296/37.9 |
| 0276147 | 8/1927 | United Kingdom . | |
| 9211793 | 7/1992 | WIPO . | |

*Primary Examiner*—Joseph D. Pape
*Attorney, Agent, or Firm*—Ostrolenk, Faber, Gerb & Soffen

[57] ABSTRACT

A combined ashtray and container, e.g., beverage can, holder for use in a motor vehicle. An ashtray housing has an ashtray cup movable into and out of the housing. An additional housing attached at the ashtray housing provides a container, e.g., beverage can holder. The beverage can holder has a support for the container or beverage can. Spaced up from the support is a holding element which grips at least partially around the container. Both the support and the holding element are arranged parallel to each other and spaced from each other in their open condition. Both the holding element and the support are foldable inward into a trough in the additional housing. The support provides a covering flap over the holding element when they are pivoted into the trough in the additional housing.

14 Claims, 5 Drawing Sheets

ASHTRAY AND CONTAINER HOLDER FOR MOTOR VEHICLES

BACKGROUND OF THE INVENTION

The present invention relates to a combined ashtray and container holder for use in motor vehicles. Various types of ashtrays for motor vehicles enjoy general popularity even among non-smokers, who may make use of the ashtray cup as a receptacle for small utensils.

SUMMARY OF THE INVENTION

The object of the present invention is to make an ashtray of the aforementioned type more usable.

For this purpose, a beverage can or cup or other container holder is arranged on the ashtray housing.

Other objects and features of the present invention are explained below with reference to the drawings, in which:

DETAILED DESCRIPTION OF THE INVENTION

Figure 1:
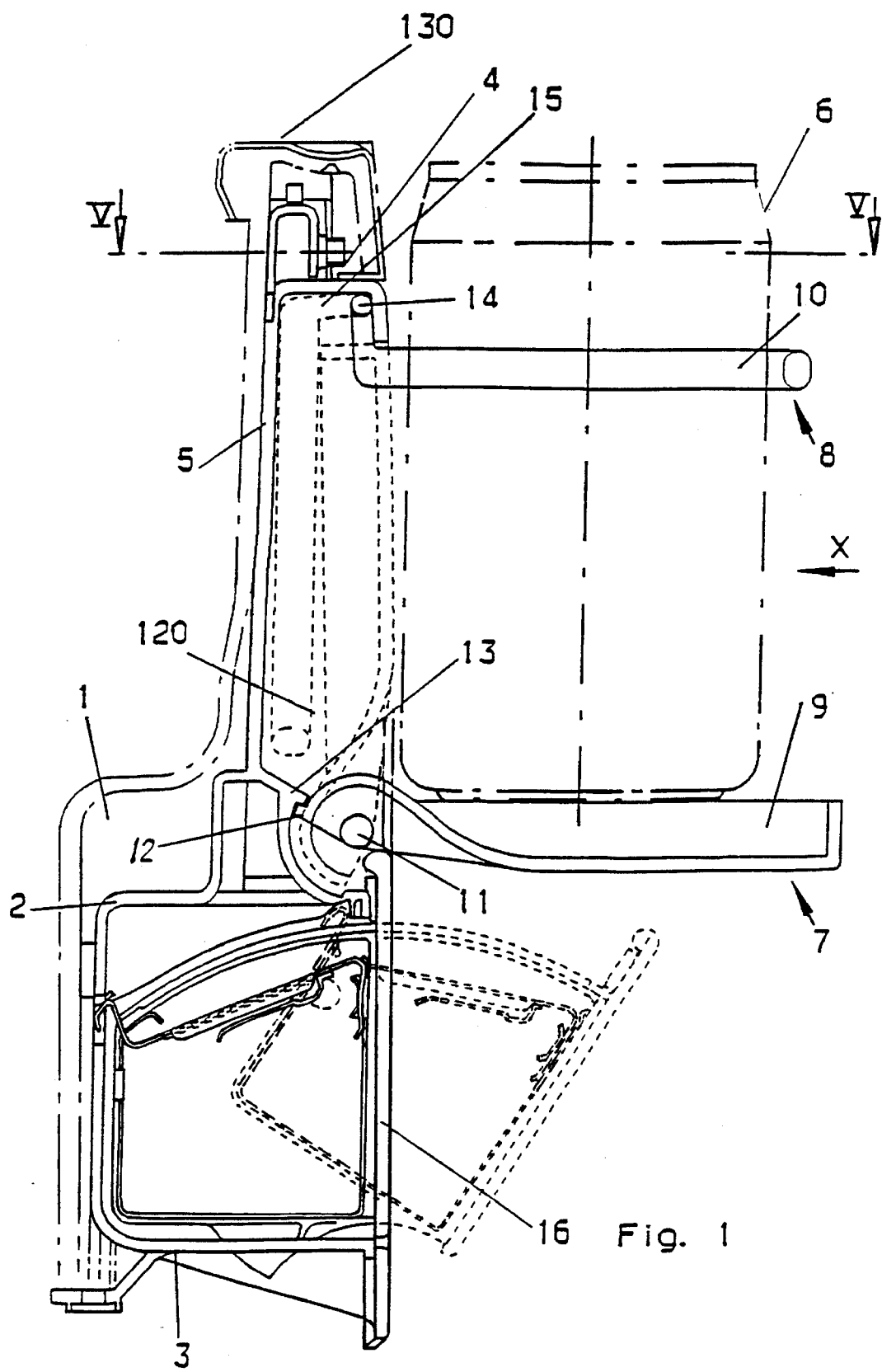
FIG. 1 is a vertical section through an ashtray and container holder of a first embodiment of the invention.

FIG. 1 shows an ashtray and container holder embodiment which is installed into an opening 1 in a part of the motor vehicle, typically in a motor vehicle console located between the front seats, although it may be installed anywhere else in the vehicle. The ashtray has an ashtray housing 2 and an ashtray cup 3 movable into and out of the housing. In this embodiment, the ashtray cup 3 is movable by being swung from its position of nonuse shown in continuous lines into its position of use shown in dashed lines. The invention, however, can also be used for an ashtray having an ashtray cup which operates like a drawer in the ashtray housing 2.

The ashtray housing 2 is developed as a plastic injection molding. It includes an additional housing part 4 which is developed of the same material as and integrally in a single piece with the housing 2. The additional housing part 4 is developed in a trough shape and has a vertically directed bottom 5. The additional housing part 4 forms an upstanding extension on the top of the ashtray housing 2. It receives a container, particularly a beverage can, holder which comprises a supporting element 7, which supports a beverage can 6 or a bottle, a cup or the like, and a holding element 8, which at least partly surrounds the beverage can 6, or the like. The supporting element and the holding element are arranged parallel to each other in their positions of use. The supporting element 7 is developed in the form of a covering flap 9, and the holding element 8 is developed as a can or cup holder ring 10.

The covering flap 9 is mounted for swinging around a horizontally arranged shaft 11 which is located in the lower region of the additional housing part 4. The flap 9 can be swung from a vertical position in which the opening 120 of the housing part 4 is closed (the position of nonuse), shown in dashed lines, into a horizontally directed position (position of use), indicated in solid lines. Once it opens, the covering flap 9 is held in its position of use by stops 12 which are formed thereon and which cooperate with mating stops 13 on the housing part 4. In its upturned position of nonuse, the covering flap 9 is held by a locking device which may be an "automatic tip" or a detent development, both not shown The holder ring 10 is mounted swingably at the upper region of the additional housing part 4 around a pivot shaft 14 which extends parallel to the shaft 11. This enables the holder ring 10 to be swung out of its covered position of nonuse, shown in dashed line, into its outwardly projecting position of use, shown in solid line. The pivoting is effected via angle arms near the shaft 14 so that, in its position of nonuse, the holder ring 10 comes to rest directly, and thus in space saving fashion, against the bottom 5 of the housing part 4. The covering flap 9 covers the holder ring 10 in the position of nonuse. The flap 9 further lies on the same vertical plane as the front plate 16 of the ashtray cup 3.

Figure 2:
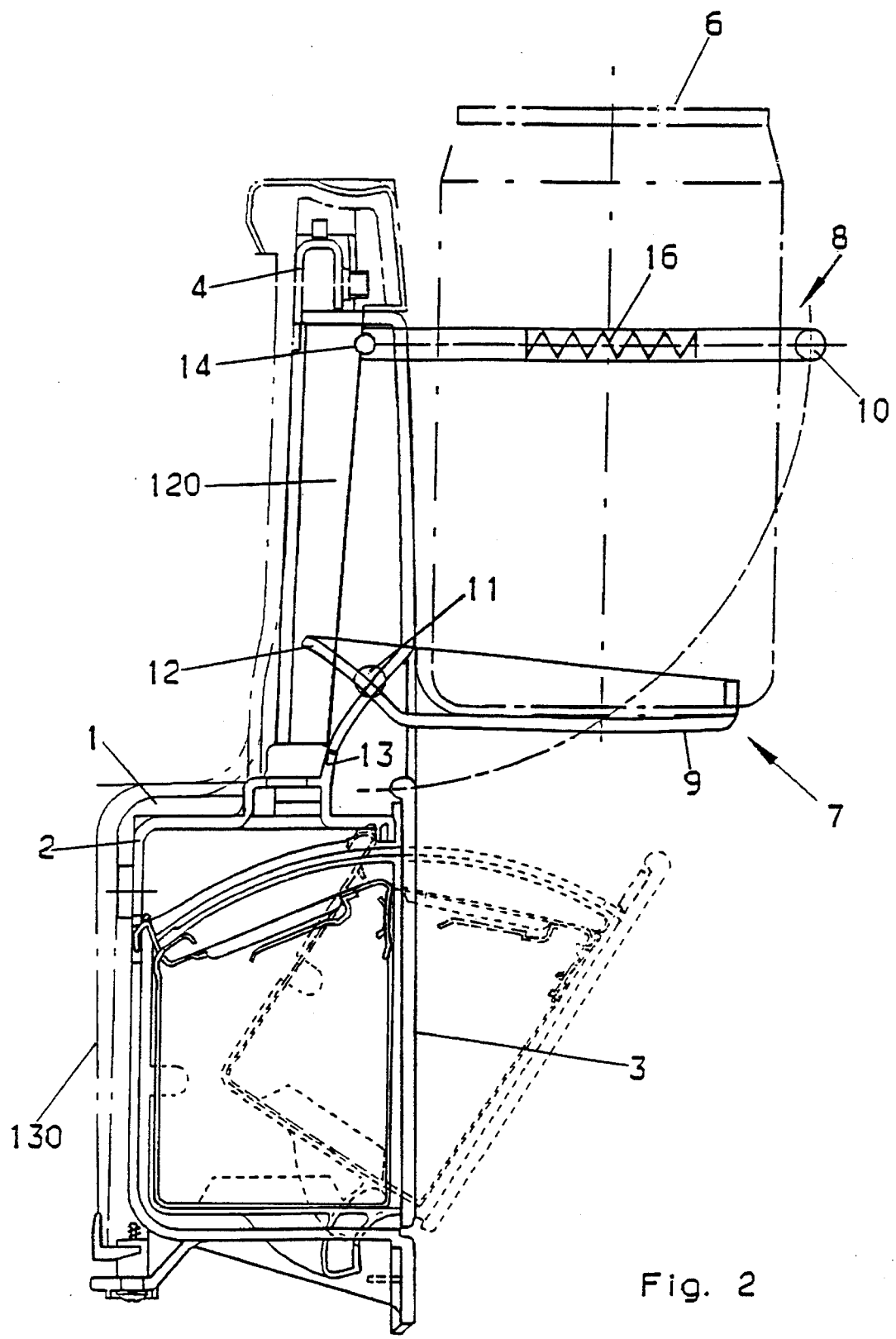
FIG. 2 is a vertical section through an ashtray and container holder of a second embodiment.

The embodiment shown in FIG. 2 corresponds to that shown in FIG. 1 with respect to their main parts. Identical reference numerals have been used for the same parts. One difference, as compared with FIG. 1, is that the ashtray cup 3 is substantially larger. With an ashtray housing 3 and housing part 4 being of the same size, the size of the covering flap 9 is reduced and its pivot axis 11 is displaced, as indicated in FIG. 2. In order to permit the swinging of the holder ring 10 into the shorter height opening 120, the holder ring can be of a telescoping type and can be urged by a spring 16 into its extended position.

Figure 3:
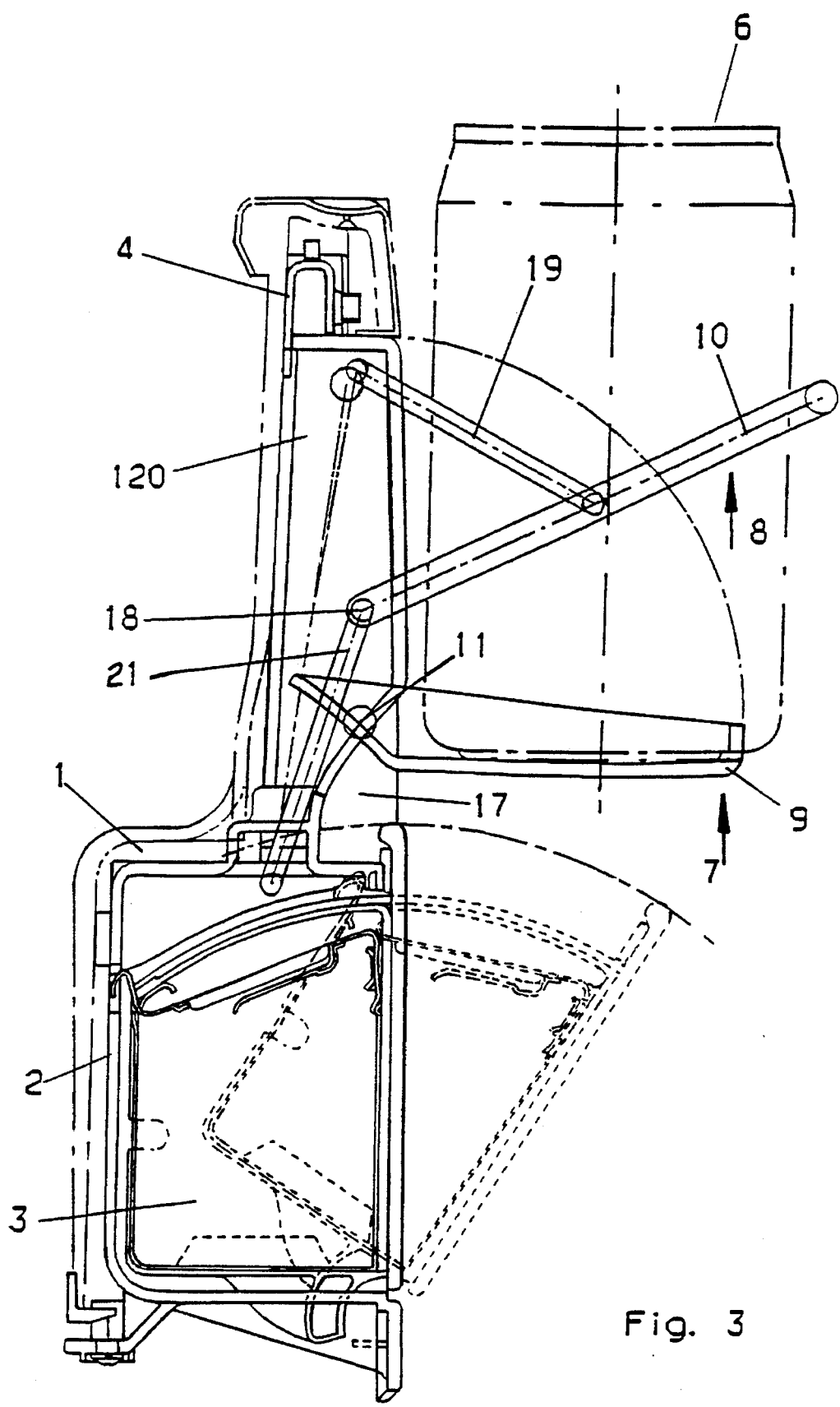
FIG. 3 is a vertical section through an ashtray and container holder in accordance with a third embodiment.

In the embodiment shown in FIG. 3, identical reference numerals have been used for parts which correspond to those in FIG. 1. A relatively large ashtray cup 3 is provided in FIG. 3. The covering flap 9 and its pivot mount on the housing part 4 correspond to FIG. 2. The development of the pivot mount make easy operation of the ashtray cup 3 possible because the cup shape of the housing part creates a grip hollow 17 at the bottom of the housing part 4 for enabling grabbing of the cup 3.

The size and shape of the holder ring 10 is the same as that in FIG. 1. The holder ring 10 can be brought into the opening 120 in a simple manner by means of a guide which comprises cam grooves 21 in the side walls of the housing part, pins 18 slidable in the grooves, and swing levers 19 on opposite sides of the housing part 4. The swing levers 19 are pivoted at one of their ends to the housing and on their other ends to the holder ring. The holder ring 10 swings out and in by the pivot 18 moving up and down the groove 17 guided by the lever 19.

Figure 4:
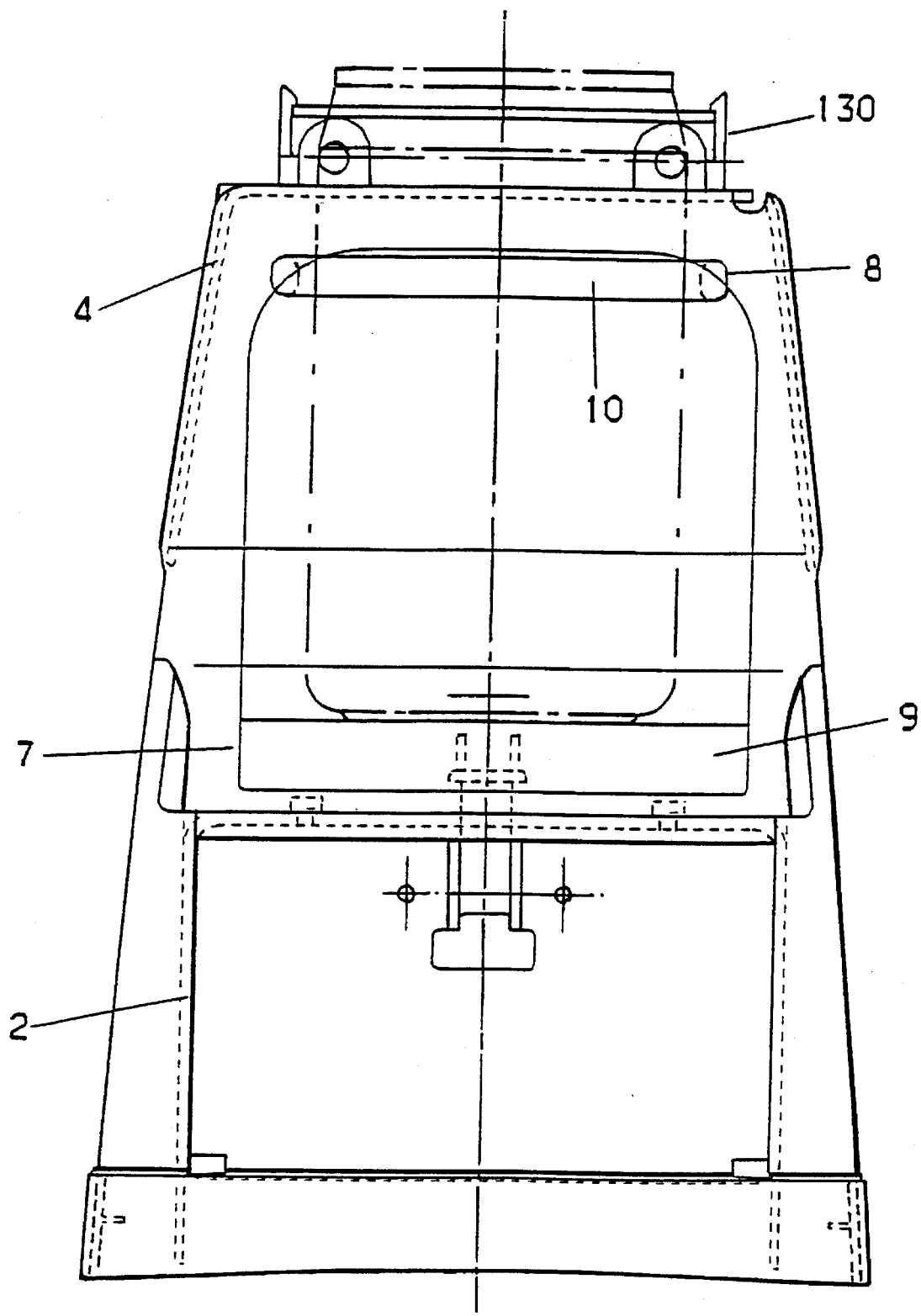
FIG. 4 is a view in the direction of the arrow x in FIG. 1.
Figure 5:
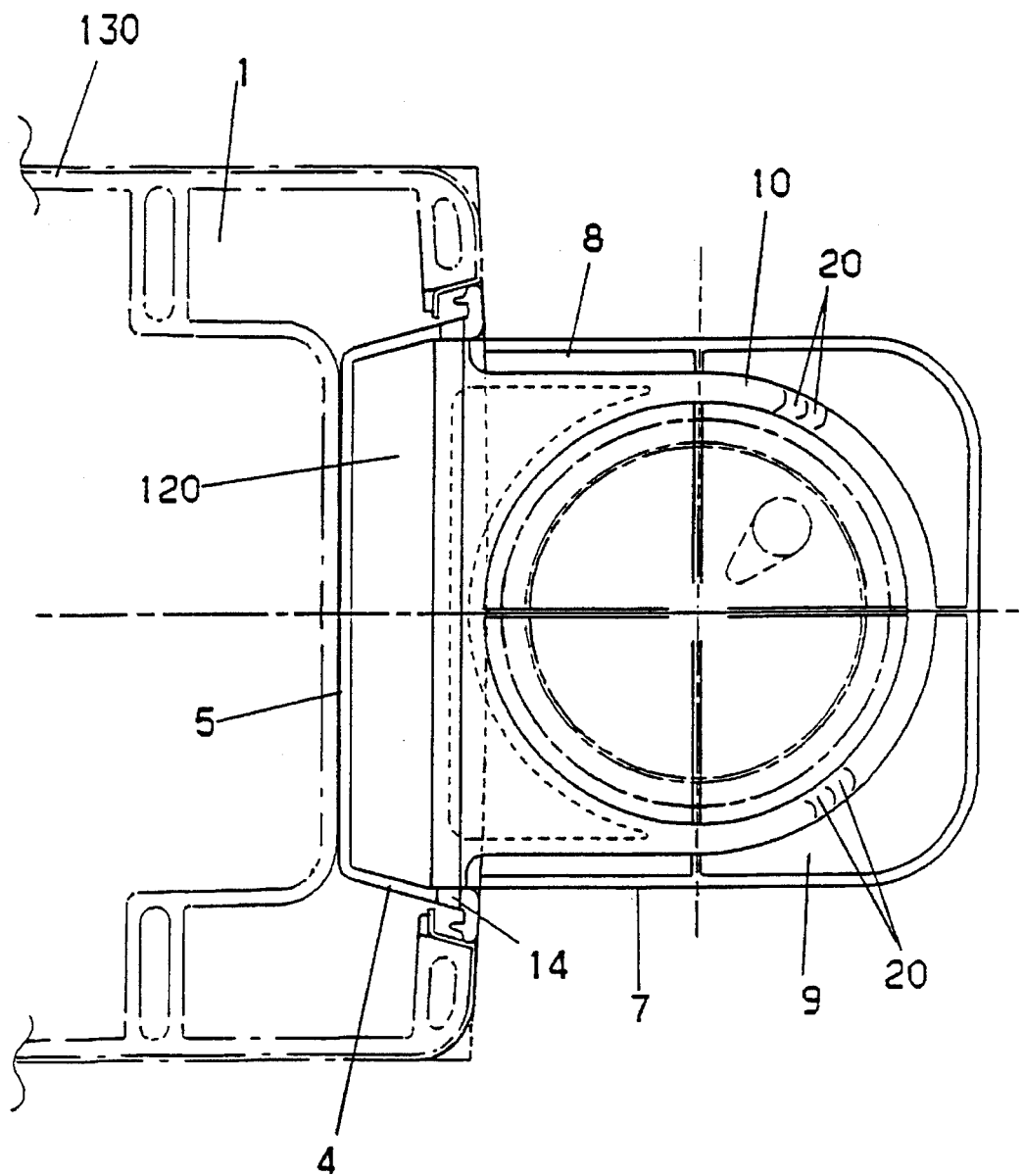
FIG. 5 is a cross section approximately along the line V—V of FIG. 1.

FIGS. 4 and 5 essentially show the new ashtray/beverage holder device in front view and top view, respectively. These show that this device is also capable of satisfying aesthetic requirements.

FIG. 5 shows the possible modification of having the holder ring 10 be less than a complete enclosure and having it instead opening toward the front which enables it to be arranged in less space in the opening 120. The holder ring 10 can thus be shortened and terminate at both sides in arms ending at lines 20.

The new ashtray is intended, in particular, for use in an opening 120 in any selected part of the motor vehicle. The embodiments shown may be inserted in an opening 120 in a vehicle console 130 between the front seats to be accessible also to the passengers sitting in the back seat. This insertion is advantageous for manufacturing reasons because there is a wide opening to receive the additional housing part 4. This opening previously had to be masked but has been put to logical use by the present invention. In addition, the new ashtray readily makes it possible to satisfy a need, which existed particularly in the rear of the car, for easily holding drink containers and furthermore in an extremely elegant and inexpensive manner.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An ashtray and container holding for use in a motor vehicle comprising an ashtray housing comprised of a plastic injection molding, an ashtray cup supported in the housing to be movable out of the housing for access to the cup and into the housing for storage;

a holder for a container supported on the housing, and the ashtray and the container holder are a single unit; the container holder comprises a support movable to a position where it supports the container and a holding element located above the support and movable to a position for at least partially surrounding the container for holding the container on the support; and the container holder includes an additional housing part developed integrally with and of the same material as the ashtray housing.

2. The ashtray and container holder of claim 1, wherein the container holder is movably supported on the housing to be movable between a position at which the holder supports a container, and a position where the container holding is moved into the housing for storage.

3. The ashtray and container holder of claim 1, wherein the support and the holding element are movable out of the housing for moving into respective operative positions to support a container and are both movable into the housing to their storage positions.

4. An ashtray and container holder for use in a motor vehicle comprising an ashtray housing, an ashtray cup supported in the housing to be movable out of the housing for access to the cup and into the housing for storage;

a holder for a container supported on the housing, and the ashtray and the container holder are a single unit; the container holder comprises a support movable to a position where it supports the container and a holding element located above the supports and movable to a position for at least partially surrounding the container for holding the container on the support;

the ashtray housing includes an additional housing part connected with the ashtray housing and that carries the container holder; the additional housing part extending away from the ashtray housing and being in the shape of a trough having a bottom which is oriented substantially vertically when the ashtray is installed in the vehicle.

5. The ashtray and container holder of claim 4, wherein the support and the holding element are arranged spaced apart from each other and extend generally parallel to each other.

6. The ashtray and container holder of claim 4, wherein both the support and the holding element are swingably mounted on the additional housing part to be swingable from a position of nonuse where both are generally parallel to and toward the bottom of the trough into a position of use where both are generally horizontal and project out of the trough.

7. The ashtray and container holder of claim 6, further comprising a generally horizontal shaft in the additional housing part about which the holding element is swingable;

the holding element and the respective shaft thereof being so shaped and positioned that in the position of nonuse, the holding element is swung adjacent the bottom of the trough.

8. The ashtray and container holder of claim 7, further comprising a second horizontally directed shaft arranged in the lower region of the additional housing part and the support being swingably mounted on the second shaft;

the second shaft being so placed and the support being so shaped that in tis position of nonuse, the support rests against the holding element.

9. The ashtray and container holder of claim 8, wherein the support is shaped so that in its position of nonuse over the holding element, the support serves as a covering flap over the holding element and the trough.

10. The ashtray and container holder of claim 8, further comprising means for locking the support and the holding element in their respective positions of use and their respective positions of nonuse.

11. The ashtray and container holder of claim 6, wherein the support is shaped so that in its position of nonuse over the holding element, the support serves as a covering flap over the holding element and the trough.

12. The ashtray and container holder of claim 6, wherein the holding element has a general ring shape.

13. The ashtray and container holder of claim 6, wherein the holding element is generally in the shape of a holder ring with an outward front side that is open.

14. In combination the ashtray and container holder of claim 6, with a vehicle console having a side thereof with a hole in it, and the ashtray housing and additional housing part being together arranged in the opening defined in the vehicle console side.

* * * * *